(12) United States Patent
Slik et al.

(10) Patent No.: US 11,853,265 B2
(45) Date of Patent: *Dec. 26, 2023

(54) DYNAMIC UPDATE TO VIEWS OF A FILE SYSTEM BACKED BY OBJECT STORAGE

(71) Applicant: NetApp, Inc., Sunnyvale, CA (US)

(72) Inventors: David Slik, Vancouver (CA); Tym Altman, Vancouver (CA); Adam F. Ciapponi, Vancouver (CA)

(73) Assignee: NETAPP, INC., San Jose, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 16/943,422

(22) Filed: Jul. 30, 2020

(65) Prior Publication Data

US 2020/0356535 A1 Nov. 12, 2020

Related U.S. Application Data

(63) Continuation of application No. 15/164,465, filed on May 25, 2016, now Pat. No. 10,740,302, which is a
(Continued)

(51) Int. Cl.
| | |
|---|---|
| *G06F 12/00* | (2006.01) |
| *G06F 16/00* | (2019.01) |
| *G06F 16/182* | (2019.01) |
| *G06F 16/185* | (2019.01) |
| *H04L 67/1097* | (2022.01) |

(52) U.S. Cl.
CPC .......... *G06F 16/183* (2019.01); *G06F 16/185* (2019.01); *H04L 67/1097* (2013.01)

(58) Field of Classification Search
None
See application file for complete search history.

(56) References Cited

U.S. PATENT DOCUMENTS

| | | |
|---|---|---|
| 3,721,757 A | 3/1973 | Ettlinger |
| 4,562,534 A | 12/1985 | Zandveld et al. |
| | (Continued) | |

OTHER PUBLICATIONS

Alspaugh, et al., "Data Management for Distributed Scientific Collaborations Using a Rule Engine," Department of Computer Science, University of Virginia, Information Sciences Institute, University of Southern California, 2008, 9 pages.
(Continued)

*Primary Examiner* — Tuan A Pham
(74) *Attorney, Agent, or Firm* — HAYNES AND BOONE, LLP

(57) ABSTRACT

A system can apply file placement rules to dynamically place files and directories within file system views backed by objects in an object storage system. After detection of an update to a first file system view that causes an update of an object in a storage grid, an object manager begins evaluation of file placement rules against metadata of the object. For each file placement rule that is triggered, the object manager determines identifies gateways that export the first file system view. The object manager then instructs the gateways to update their representations of the first file system view. The disclosed embodiments may be able to scale to managing hundreds of billions of files spanning thousands of file system views, especially in the presence of disconnected operation.

17 Claims, 14 Drawing Sheets

Related U.S. Application Data continuation of application No. 13/782,056, filed on Mar. 1, 2013, now Pat. No. 9,355,120.

(60) Provisional application No. 61/606,280, filed on Mar. 2, 2012.

(56) References Cited

U.S. PATENT DOCUMENTS

| | | | |
|---|---|---|---|
| 5,428,769 A | 6/1995 | Glaser et al. | |
| 5,475,706 A | 12/1995 | Kobayashi et al. | |
| 5,504,883 A | 4/1996 | Coverston et al. | |
| 5,522,077 A | 5/1996 | Cuthbert et al. | |
| 5,634,052 A | 5/1997 | Morris | |
| 5,729,738 A | 3/1998 | Watanabe et al. | |
| 5,778,395 A | 7/1998 | Whiting et al. | |
| 5,806,075 A | 9/1998 | Jain et al. | |
| 5,845,080 A | 12/1998 | Hamada et al. | |
| 5,890,156 A | 3/1999 | Rekieta et al. | |
| 6,314,460 B1 | 11/2001 | Knight et al. | |
| 6,356,563 B1 | 3/2002 | Nicoll et al. | |
| 6,535,864 B1 | 3/2003 | Zahn | |
| 6,567,818 B1 | 5/2003 | Frey et al. | |
| 6,735,220 B1 | 5/2004 | Shirriff | |
| 6,775,668 B1 | 8/2004 | Goel | |
| 6,779,082 B2 | 8/2004 | Burger et al. | |
| 6,782,389 B1 | 8/2004 | Chrin et al. | |
| 6,898,589 B2 | 5/2005 | Erdmenger et al. | |
| 6,976,165 B1 | 12/2005 | Carpentier et al. | |
| 7,000,141 B1 | 2/2006 | Karlsson et al. | |
| 7,027,463 B2 | 4/2006 | Mathew et al. | |
| 7,028,071 B1 | 4/2006 | Slik | |
| 7,127,475 B2 | 10/2006 | Gotz et al. | |
| 7,143,251 B1 | 11/2006 | Patterson | |
| 7,299,250 B2 | 11/2007 | Douceur et al. | |
| 7,343,459 B2 | 3/2008 | Prahlad et al. | |
| 7,376,764 B1 | 5/2008 | Todd | |
| 7,505,586 B2 | 3/2009 | Schmidt | |
| 7,546,486 B2 | 6/2009 | Slik et al. | |
| 7,590,672 B2 | 9/2009 | Slik et al. | |
| 7,624,158 B2 | 11/2009 | Slik et al. | |
| 7,664,794 B2 | 2/2010 | Kasmirsky et al. | |
| 7,814,054 B2 | 10/2010 | Laurion | |
| 7,885,936 B2 | 2/2011 | Austin et al. | |
| 7,899,850 B2 | 3/2011 | Slik et al. | |
| 8,261,033 B1 | 9/2012 | Slik et al. | |
| 9,355,120 B1 | 5/2016 | Slik et al. | |
| 10,740,302 B2 | 8/2020 | Slik et al. | |
| 2002/0035638 A1 | 3/2002 | Gendron et al. | |
| 2002/0133491 A1* | 9/2002 | Sim | G06F 16/10 |
| 2002/0133515 A1 | 9/2002 | Kagle et al. | |
| 2003/0040854 A1 | 2/2003 | Rendahl et al. | |
| 2003/0149709 A1 | 8/2003 | Banks | |
| 2003/0172239 A1 | 9/2003 | Swank | |
| 2004/0139222 A1 | 7/2004 | Slik et al. | |
| 2004/0153739 A1 | 8/2004 | Trimmer et al. | |
| 2004/0199566 A1 | 10/2004 | Carlson et al. | |
| 2004/0243997 A1 | 12/2004 | Mullen et al. | |
| 2004/0267689 A1 | 12/2004 | Gavlak et al. | |
| 2005/0010529 A1 | 1/2005 | Zalewski et al. | |
| 2005/0021566 A1 | 1/2005 | Mu | |
| 2005/0114611 A1 | 5/2005 | Durham et al. | |
| 2005/0120025 A1 | 6/2005 | Rodriguez et al. | |
| 2005/0195660 A1 | 9/2005 | Kavuri et al. | |
| 2005/0246311 A1 | 11/2005 | Whelan et al. | |
| 2006/0004689 A1 | 1/2006 | Chandrasekaran | |
| 2006/0004820 A1 | 1/2006 | Claudatos et al. | |
| 2006/0010169 A1 | 1/2006 | Kitamura | |
| 2006/0026219 A1 | 2/2006 | Orenstein et al. | |
| 2006/0080362 A1 | 4/2006 | Wagner et al. | |
| 2006/0136691 A1 | 6/2006 | Brown et al. | |
| 2006/0161635 A1* | 7/2006 | Lamkin | G06F 16/16 709/217 |
| 2006/0190358 A1 | 8/2006 | Slik | |
| 2007/0005774 A1 | 1/2007 | Singh | |
| 2007/0022129 A1 | 1/2007 | Bahar et al. | |
| 2007/0094316 A1 | 4/2007 | Rodriguez et al. | |
| 2007/0220320 A1 | 9/2007 | Sen et al. | |
| 2007/0294310 A1 | 12/2007 | Yagawa | |
| 2008/0059746 A1 | 3/2008 | Fisher | |
| 2008/0126404 A1 | 5/2008 | Slik et al. | |
| 2008/0195827 A1 | 8/2008 | Saika | |
| 2008/0235247 A1 | 9/2008 | Krantz et al. | |
| 2008/0270698 A1 | 10/2008 | Shirogane et al. | |
| 2009/0018866 A1 | 1/2009 | Christen | |
| 2009/0030953 A1 | 1/2009 | Fukuda et al. | |
| 2009/0089340 A1 | 4/2009 | Ohr et al. | |
| 2009/0216796 A1 | 8/2009 | Slik et al. | |
| 2009/0271412 A1* | 10/2009 | Lacapra | G06F 16/178 |
| 2010/0082513 A1 | 4/2010 | Liu | |
| 2010/0169392 A1* | 7/2010 | Lev Ran | G06F 16/1774 707/827 |
| 2010/0185963 A1* | 7/2010 | Slik | G06F 16/278 715/764 |
| 2011/0125814 A1 | 5/2011 | Slik et al. | |
| 2012/0036220 A1* | 2/2012 | Dare | H04L 67/04 709/217 |

OTHER PUBLICATIONS

Brocade Communications Systems, Inc., "Maximizing Efficiency in Block-Level Data Migration," Storage Area Network, San White Paper, Apr. 2007, pp. 1-9, (Apr. 2007 GA-WP-861-00).

Chervenak, et al., "A Data Placement Service for Petascale Applications," USC Information Sciences Institute, Marina Del Rey, CA, Nov. 2007, 6 pages.

Chervenak, et al., "Data Placement for Scientific Applications in Distributed Environments," USC Information Science Institute, Marina Del Rey, CA, Computer Science Department, University of Wisconsin Madison, Madison, WI, Sep. 2007, 8 pages.

Chu, et al., "The Exclusive-Writer Protocol: A Low Cost Approach for Updating Replicated Files in Distributed Real Time Systems," Proc. 3rd Int. Conf. Distrib. Comput. Syst., Oct. 1982, pp. 219-220.

Cooper, et al., "Implementing a Reliable Digital Object Archive," Department of Computer Science, Stanford University, Jun. 2000, pp. 1-12.

Elson J., et al., "Random, Ephemeral Transaction Identifiers in Dynamic Sensor Networks," Department of Computer Science, University of California, Los Angeles, 2001, 10 pages.

Final Office Action dated Dec. 11, 2012 for U.S. Appl. No. 12/356,049, filed Jan. 19, 2009, 38 pages.

Herman D., "Towards a Systematic Approach to Implement Distributed Control of Synchronization," Distributed Computing Systems, 1983, pp. 50-51, 54-55.

Howard P., "Data Migration," A White Paper by Bloor Research, Oct. 2007, pp. 1-15.

International Search Report and Written Opinion for Application No. PCT/IB2007/004346 dated Sep. 9, 2008, 11 pages.

International Search Report and Written Opinion for Application No. PCT/IB2007/004580 dated Dec. 4, 2008, 12 pages.

Introduction to iRods, www.irods.org, Sep. 2008, 5 pages.

ISO/IEC 11578, Information Technology-Open Systems Interconnection-Remote Procedure Call, RPCI, 1996, pp. 533-538.

Ko B., et al., Distributed, Self-Stabilizing Placement of Replicated Resources in Emerging Networks, Department of Electrical Engineering, Columbia University, New York, NY, 2003, 10 pages.

Lecture Notes in Compute Science, 1981, vol. 105, pp. 194-197, 202-203, 300-301.

Lippman, "Asymmetric Coding of Motion Picture Sequences," MIT Media Lab, Jun. 1998, 3 pages.

Little, et al., "The Replica Management System: A Scheme for Flexible and Dynamic Replication," Department of Computing Science, University of Newcastle upon Tyne, Newcastle upon Tyne, UK, and Xerox Corporation, Webster, NY, Mar. 1994, pp. 1-12.

Lo S-L., "A Modular and Extensible Network Storage Architecture," Cambridge University Press, 1995, pp. 51, 53-54.

Lu, et al., "Aqueduct: Online Data Migration With Performance Guarantees," Proceedings of the FAST 2002 Conference on File and Storage Technologies (FAST '02), Monterey, CA (USENIX, Berkeley, CA), Jan. 28-30, 2002, pp. 219-230.

(56) References Cited

OTHER PUBLICATIONS

Lubeck, et al., "An Overview of a Large-Scale Data Migration," Database Group, IT Division, European Organization for Nuclear Research (CERN), Jan. 17, 2003, 7 pages.

Ma K., et al., "Web-based Monitoring and Management System for Integrated Enterprise Wide Imaging Networks," Medical Imaging 2003, PACS and Integrated Medical Information Systems: Design and Evaluation, vol. 5033, pp. 160-171.

Manivannan, et al., "A Decentralized Token Generation Scheme for Token-Based Mutual Exclusion Algorithms," International Journal of Computer Systems Science and Engineering, Jan. 1996, vol. 11 (1), pp. 45-54.

McCue, et al., "Computing Replica Placement in Distributed Systems," IEEE Second Workshop on Replicated Data, Computing Laboratory, University of Newcastle Upon Tyne, Monterey, Nov. 1992, pp. 58-61.

Milenkovic M., "Update Synchronization in Multiaccess Systems," Distributed database systems, No. 8, 1979, pp. 2-3, 8-11, 32-35.

Moore, et al., "Policy Core Information Model—Version 1 Specification," The Internet Society, 2001, pp. 1-100.

Nirvanix Datasheet, (NDS-Ingestionservices-1108), Nov. 5, 2008, 2 pages.

Non-Final Office Action dated Jul. 11, 2013 for U.S. Appl. No. 12/356,049, filed Jan. 19, 2009, 50 pages.

Silk, et al., "A Comprehensive Security Framework for the Communication and Storage of Medical Images," Medical Imagining 2003: PACS and Integrated Medical Information Systems: Design and Evaluation, SPIE, May 2003, vol. 5033, pp. 212-223.

Slik D., et al., "Scalable Fault Tolerant Image Communication and Storage Grid," SPIE USE, V.2 5033-7, Jan. 17, 2003, pp. 36-47.

Sollins, et al., "Functional Requirements for Uniform Resource Names," RFC 1737, Dec. 1994, pp. 1-7.

SureSync Evaluators Guide, Software Pursuits, Inc., 2006, 21 pages.

Terry, et al., "The Case for Non-transparent Replication: Examples from Bayou," Computer Science Laboratory, Xerox Palo Alto Research Center, Palo Alto, CA, 1998, 10 pages.

The Hidden Costs of Data Migration, IBM Global Technology Services, Dec. 2007, pp. 1-12 (GTW01279-USEN-01).

\* cited by examiner

700

Matching Criteria

☐ Filter 1      [Files created in document share — 701]      [+] — 702

Where:  [object.share ▾] — 703   [Equals ▾] — 704   [documents ▾] — 705   [-]

And     [object.path ▾] — 703   [Starts With ▾] — 704   [/ ▾] — 705   [+][-] — 706

Matching Criteria

☐ Filter 1    [API Ingested Objects]   1401    [+] 1402

Where: [object.appID ▼] 1403   [Equals ▼] 1404   [Omynx] 1405   [-]

Where: [object.type ▼] 1403   [Equals ▼] 1404   [Image] 1405   [+][-] 1406

Where: [object.image_id ▼] 1403   [Exists ▼] 1404    [+][-] 1406

Actions

☐ Action 1    [Create Files in Omnyx Share] 1407    [+] 1408

Destination Share: [Omnyx Images ▼] 1409

On Object Create: [Create File/Directory ▼] 1410    On Conflict: [Newer Replaces ▼] 1411

File Path: [/omnyx/images/#(object.image_id).jpg] 1412    Permissions: [Destination Parent ▼] 1413

On Object Update: [Update File/Directory ▼] 1414

On Object Delete: [Delete File/Delete Directory if Empty ▼] 1415

FIG. 14

DYNAMIC UPDATE TO VIEWS OF A FILE SYSTEM BACKED BY OBJECT STORAGE

BACKGROUND

The disclosure generally relates to content storage systems, and in particular it relates to representations of data objects in content storage systems.

As computing systems increase in scale and reach, the requirement to be able to reliably access stored data from multiple locations and at high rates has increased in importance. When computing systems were first introduced into the business environment, they were centralized into one facility, and accessed in a very controlled environment. With the introduction of networking and WAN technologies, distributed processing began to be adopted as computing resources could be spread across multiple facilities, and across multiple computing resources within a given facility. In the early 1980's the "File Server" became a widely deployed technology, led by Novell Netware, and provided location independence of data storage, in that an employee or user could access their files and data from any computer connected to the file server. By storing data centrally instead of on each individual computer, many problems were solved, including data portability, reliability (the file servers could be made more reliable), and economies of scale were introduced, as the storage resources on the file server could be shared across many users, and common infrastructure for backup could be leveraged.

Despite these advantages, centralized file servers have many disadvantages, including issues involving network disconnections resulting in loss of accessibility to stored data, single points of failure that could result in data loss, and scalability challenges in handling larger data volumes.

SUMMARY

To overcome the limitations of the prior art, systems and methods for dynamic placement of files are disclosed. Disclosed embodiments provide a synchronized file system namespace (directory/metadata) across multiple gateways which are separated geographically. Also disclosed is a file system namespace synchronization that is able to continue to operate during network partitioning. The disclosed embodiments are also able to resolve file system namespace conflicts resulting from changes made during network partitioning. Other aspects of the disclosure include partial synchronization of a name space (unidirectional and bidirectional) and the ability to programmatically configure the partial synchronization of a namespace.

Embodiments of the invention allow the programmatic generation of file system views into a common object store based on a user-defined set of synchronization rules, where the behavior of the gateway and the means of synchronization can be specified by the user.

One aspect is a method of automatically arranging files into a hierarchical directory structure, the method being performed within a distributed storage system. The method comprises receiving a user-defined placement rule comprising at least file selection criteria and a placement action, wherein the placement action comprises information relating to locations in the hierarchical directory structure to place files that correspond to the file selection criteria; receiving, at a first gateway device, a file to be stored in the distributed storage system; determining that the file corresponds to the file selection criteria of the rule; determining a location in the hierarchical directory structure to place the file if the file corresponds to the file selection criteria of the rule, the determined location being based on the placement action of the rule and at least one attribute of the file; and transmitting, to a second gateway device, a notification including information to enable the second gateway to update a cached representation of the hierarchical directory structure to include the determined location.

BRIEF DESCRIPTION OF THE DRAWINGS

FIG. 7 is a sample graphical user interface for specifying matching criteria.

FIG. 14 is a sample graphical user interface for specifying an object-to-file-system rule.

DETAILED DESCRIPTION

Figure 1:
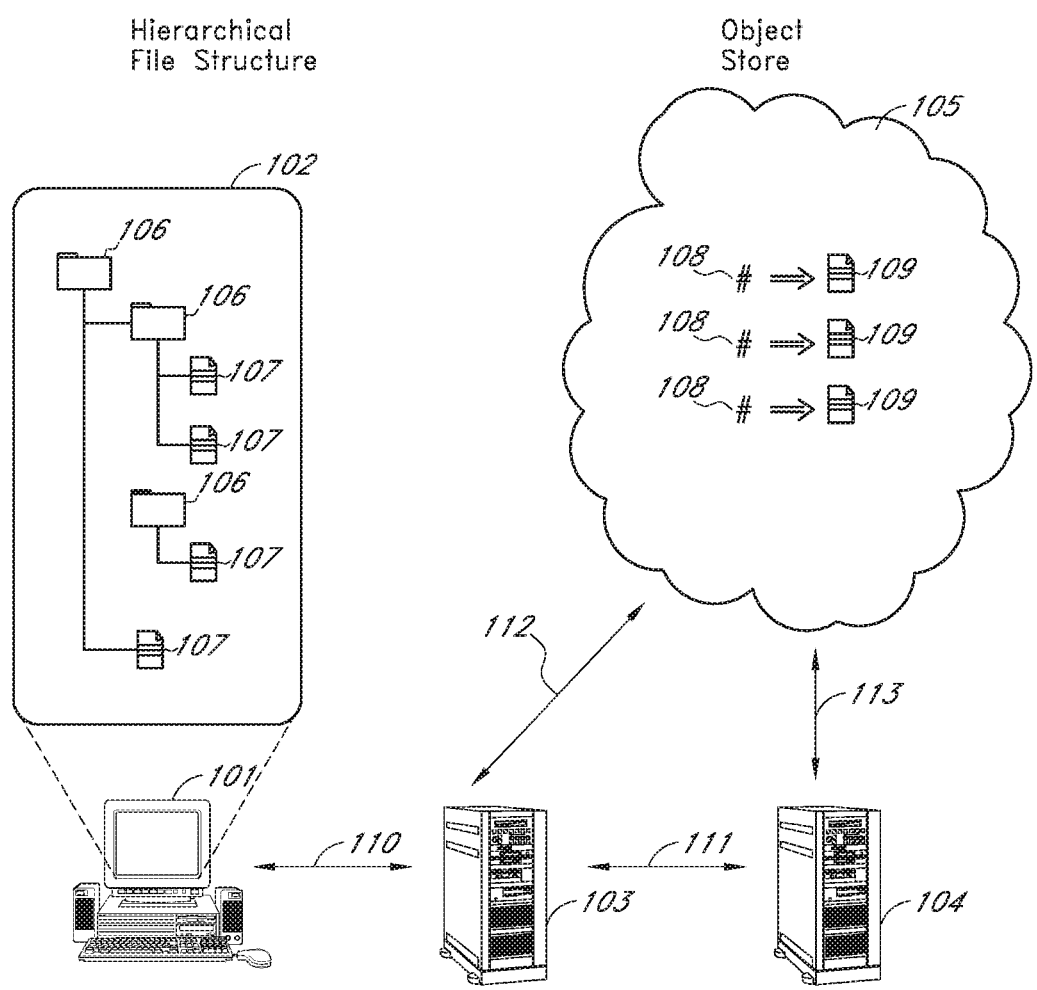
FIG. 1 is a diagram of an embodiment of a data object storage system.

Embodiments of the invention may include a number of capabilities. One possible capability may be the ability to define what file system views into the storage system. This may be specified by creating "shares", which can be accessed over a network by client systems, and may be based on higher-level business requirements such as the needs of users, workgroups and business processes within an organization or across organizations.

A second possible capability is a way to specify which file system views should be accessible from different access points, reflecting the geographic topology of these access points. These access points are defined as part of the topology of the grid. As part of this configuration, the degree of caching can be configured, which is a trade-off between latency and resource consumption.

A third possible capability is a way to express which files should be placed in file system views according to a desired placement. Some embodiments may allow the set of files to be specified based on information about the files or objects, such that when a file or object is encountered, the desired placement can be determined.

A fourth possible capability is a way to place a given file that has been matched with a desired placement is needed. Once matched, the desired changes to the file system views may be performed in order to accomplish the desired placement. In cases where the desired placement can not be performed due to an unreachable condition of the current topology, a way to queue placement may be included, and when concurrent updates result in conflicts, a way to resolve these conflicts may be included.

A fifth possible capability is a way to determine when changes to the rules governing placement have occurred, so that the placement of the files may be re-evaluated. This primarily results from changes to the configuration specifying the placement and/or matching criteria for files that determines which placements are desired for which subsets of files.

In various embodiments of the invention, any combination of these and other capabilities may be implemented in a scalable fashion such that the number of managed files is linearly scalable into the hundreds of billions while requiring a minimal amount of computer and storage hardware to perform the embodiment of the invention. The embodiments described throughout this specification can provide efficient design approaches with respect to these tasks.

Use Cases

There are several common usage patterns to file sharing, which are addressed by embodiments of the invention.

Mobility—Files can be accessed and modified at multiple locations, but are typically only accessed or modified from one location at any given time. Examples of this usage pattern include home directories in a single sign-on computing environment.

Workflow—Files are created at one or more locations, and accessed, modified or deleted at a third location. Examples include scenarios where multiple applications are exchanging file data, such as batch scanning and OCR processing, etc.

Publishing—Files are created at one location, but read-only access is provided for many other locations. Examples include document repositories, media storage for streaming access and archives.

Collaboration—Files are created in multiple locations and are modified in multiple locations. Examples include document creation.

While the most common use for a distributed file system is to allow every user to see the same global namespace, another use case has different users and different sites being able to see different subsets of this global namespace. This may be enforced by access controls, such as ACLs.

Architecture

An embodiment of the invention, such as that depicted in FIG. 1, provides storage services to external applications. Applications package data into discrete objects 105, which are submitted to the grid, optionally along with associated metadata, as part of an initial storage process, which is known as "ingest." In one embodiment, the object store is a fixed-content object store; that is, objects 109 cannot be modified once they are ingested. In another embodiment, the object store allows objects to be modified after being ingested. Further details on implementation of a storage grid may be found in U.S. Pat. Nos. 7,546,486 to Slik et al., and 8,898,267 by Slik et al. filed Jan. 19, 2009, which are hereby incorporated by reference.

Once an object has been ingested, the system provides the management of the object over time. Management involves ensuring that the object is reliably stored for the required duration, is protected against failures, and has the Quality of Service (QoS) characteristics that are desired.

In an embodiment, each stored object 109 may have one or more unique identifiers 108. These identifiers are known as object handles and may be implemented as allocated UUIDs. In other embodiments, the identifiers may include hash values of the associated object, sequentially incrementing ID values, or other identifiers. The control components within an object storage system manage object handles, and assign them to clients based on client requests or internal operations.

In an embodiment, the object store 105 maintains counts of the number of object handles 108 associated with each object 109. Thus, Object Handles area commitment from the object storage system to a client that the object associated with the handle will be preserved by the storage system. The object will only be eligible for purging when all handles have been released by the clients (a common approach to object management called "reference counting"). This approach works as long as the objects are fixed and cannot be altered. If objects can be changed, changes made to an object through one handle would visible through all other handles. In other embodiments, each object is associated with exactly one object handle or identifier.

Objects 105 can be ingested into the object store 105 directly by clients via an HTTP API, or indirectly via a "Gateway" 103. The gateway 103 may communicate with client computers 101 via a file exchange network protocol 110. The gateway 103 and client 101 may communicate over the Internet, a LAN, a serial cable, or any other communication means. Examples of gateways 103 in various embodiments of the invention are the File System Gateway, which provides standard CIFS/NFS access for clients, and the DICOM Gateway, which provides DICOM protocol access for clients. In addition to the Common Internet File System (CIFS), Network File System (NFS), and DICOM protocols, any other network protocols suitable for the exchange of files over a network may be implemented on such a gateway, such as FTP, WebDAV, or HTTP. A gateway may implement any suitable network protocol or any combination of such protocols.

The gateway 103 may further communicate with the object store 105 via a network protocol 112. In an embodiment, the protocol 112 is an HTTP API, although other protocols may be used. Protocol 112 may be the same protocol that clients use to communicate with the object store, or it may be a specialized communication protocol.

In an embodiment, the gateway 103 provides the client computer 101 with a file system view 102. A file system view includes a series of directories 106 and files 107, arranged in to a hierarchical tree. Each file and directory may include metadata, such as the file and directory name, and permissions metadata that controls which users can perform actions on the files and directories. An example of a typical file system tree is shown in Table 1 below:

TABLE 1

| Path | Type | Name |
| --- | --- | --- |
| / | Root | N/A |
| /documents/ | Directory | "Documents" |
| /documents/storage.doc | File | "storage.doc" |
| /documents/notes.txt | File | "revisions.txt" |
| /images/ | Directory | "images" |
| /images/server.jpg | File | "server_room.jpg" |

The gateway 103 presents a file system view 102 to the client computer 101 based on objects 109 stored in the object store 105. Thus, the gateway performs a mapping between the object store's object handles 108 and objects 109 on the one hand, and the directories 106 and files 107 of the file system view on the other. When mapping a file system presentation into an object storage system, each file and directory must be associated with a stored object, as shown in the example Table 2 (note that the UUID values are truncated).

TABLE 2

| Path | UUID | Object |
|---|---|---|
| / | 7B1DD88C . . . | 12452 |
| /documents/ | 1984E7D5 . . . | 54214 |
| /documents/storage.doc | 53315C6D . . . | 31532 |
| /documents/notes.txt | 052FC8B0 . . . | 35234 |
| /images/ | 2147000E . . . | 42146 |
| /images/server.jpg | 84614DDB . . . | 82423 |

The gateway 103 further may communicate with an object manager 104 via a connection 111. The object manager provides functionalities for synchronizing the file system views presented by multiple gateways. The object manager 104 may also communicate with the object store 103 by a protocol 113, which may be the same as the protocol 112 or a different protocol. The object manager 104 may thus retrieve information about file system views presented by gateways, retrieve information about the object store, and possibly transmit messages to either the object store or the gateways to affect views, objects, or other aspects of the system, as described in detail below.

The depicted embodiment involves a form of mapping or translation between files in a file system view and objects in an object store. Thus, the terms "file" and "object" may be considered synonymous, insofar as each refers to a collection of data and possibly metadata. They may also be differentiated insofar as the term "file" is typically used with respect to hierarchical file systems and the term "object" is more typically associated with database-like storage.

Although FIG. 1 depicts one possible embodiment of the system, other arrangements may be contemplated. For example, the object manager 104 may be eliminated, with the gateways 103 serving its purpose. In another embodiment, the devices making up the object store 105 are configured to communicate both via an HTTP API and to present a file system view, thus bypassing the gateway and object manager altogether. Additionally, the devices need not be spatially near each other. For example, a gateway may be located far away from an object manager and communicate via an Internet connection. The network connections need not be permanently active, as the system may be configured to handle disconnected states.

Figure 2:
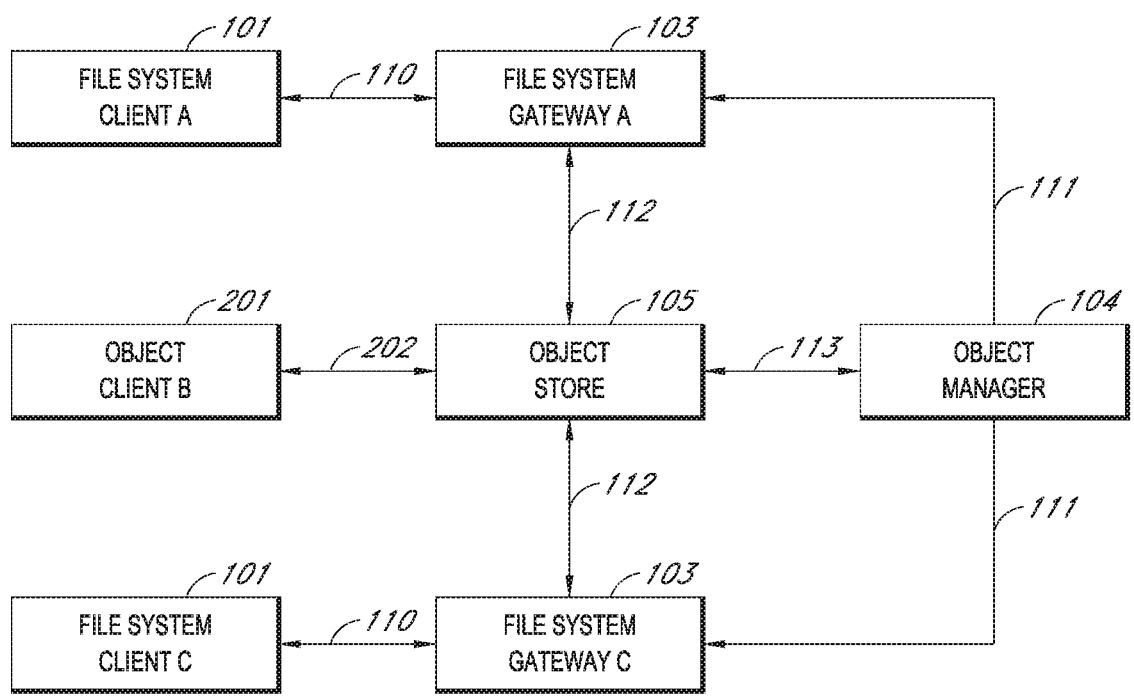
FIG. 2 is another view of an embodiment of a data storage system.

FIG. 2 presents another representation of an embodiment of the invention, illustrating object/file flows through the system. File system clients A and C 101 communicate with file system gateways A and C 103, respectively, via communications links 110 that, as explained above, may utilize various protocols, including NFS and CIFS. The gateways 103 communicate with an object store 105 via an HTTP API or other protocol. An object manager 104 communicates with the object store 105 over communication link 113, which allows the object store 105 to transmit object metadata to the object manager 104. The object manager 104 in turn transmits directory updates and other information to the gateways 103 via communication link 111, thus allowing the gateways 103 to present the clients 101 with synchronized file system views.

Also shown is an object client B 201 that communicates directly with the object store 105 via communication link 202, which may utilize an HTTP API. Thus, the system of this embodiment provides multiple means of access to the object store: either by direct access, or through a file system view presented by a gateway. Other embodiments may provide other means of access or may provide fewer means of access.

While the object store 105 and object manager 104 have so far been described as single entities, the invention is not necessarily so limited. In some embodiments, the object store 105 and/or the object manager 104 comprise a distributed collection of computers. Furthermore, the object store 105 and object manager 104 may operate on the same hardware and processor, or on different hardware and processors. Introducing distributed object stores and object managers may add robustness to the system, allowing it to tolerate loss of connectivity among machines or other machine failures.

Figure 3:
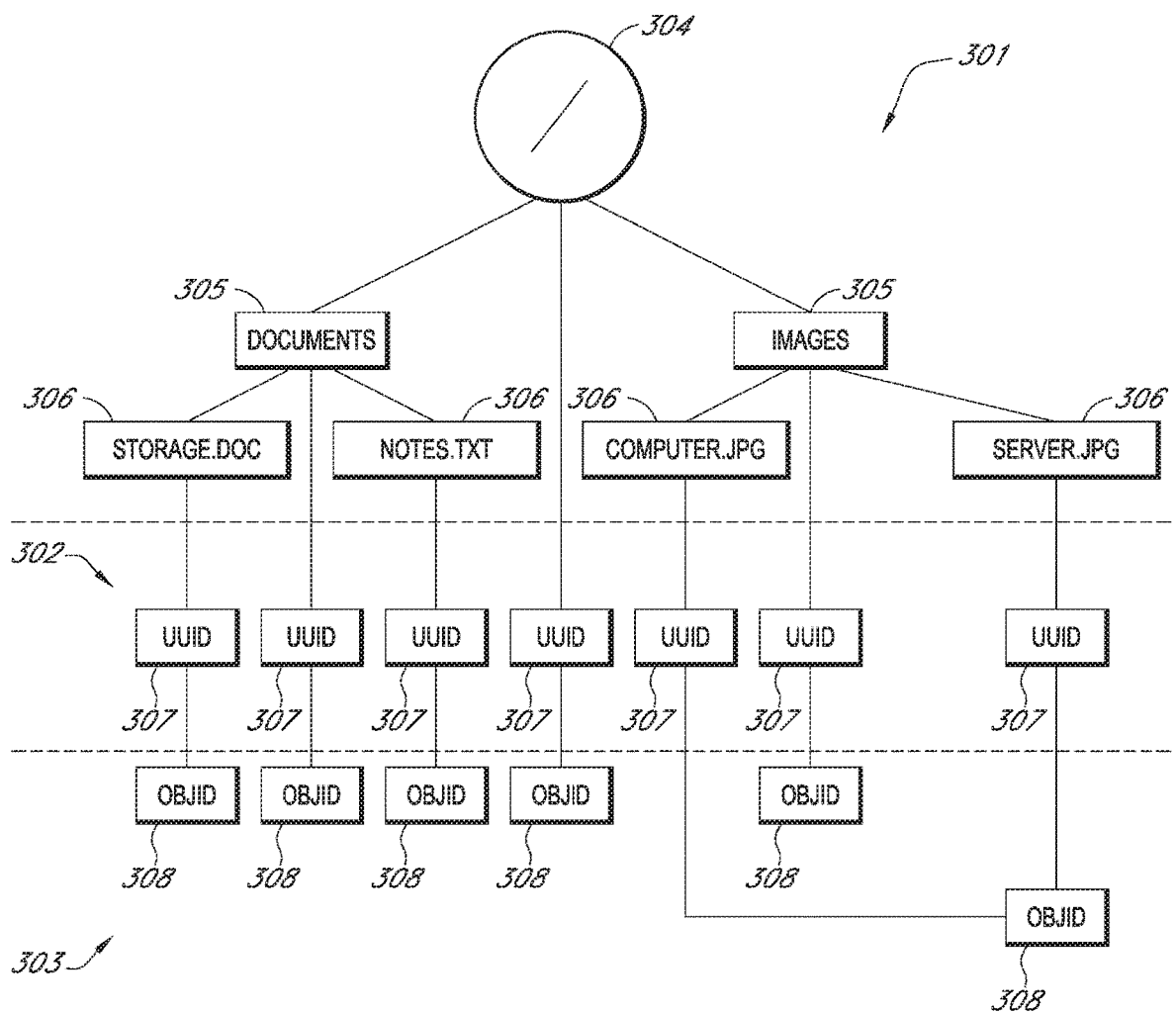
FIG. 3 is a representation of a hierarchical file system.

A illustration of a possible file system view is provided in FIG. 3. In an embodiment, file hierarchy 301 comprises a root directory 304, subdirectories 305, and files 306. In embodiments, there may be multiple root directories, as in the MS-DOS file system, or a single root directory, as in the UNIX file system.

In an embodiment, the elements of the hierarchy 301 are linked to UUIDs 307 or other identifier values, which are linked in turn to particular objects or object IDs 308. In an embodiment, more than one UUID 307 may be linked to a single object 308. In other embodiments, only one UUID 307 may be linked to an object ID 308. Additionally, in an embodiment, only files are linked to UUIDs, and directories are not linked to UUIDs. In another embodiment, only some of the files are linked to UUIDs, and other files are maintained locally on a gateway.

The UUIDs 307 may be the object handles described above, or they may be a different set of identifiers. The objects 308 may be objects stored in the object store, or object handles, or other identifiers referring to objects in the object store. The sets of UUIDs and objects 302 and 303 are stored in the object store, in the object manager, on the gateways, or at any combination of those entities. The client computers are presented with the file hierarchy 301, which provides a familiar interface for file viewing and manipulation.

Where an object may be linked to multiple UUIDs, it is possible to have multiple entities within a single file system view or in several file system views that point to identical objects within the underlying object storage system. For example, in FIG. 3, the files "computer.jpg" and "server.jpg" both reference the same underlying object. Another example of mapping multiple file system entities to a common underlying object via multiple UUIDs is shown in Table 3:

TABLE 3

| Path | UUID | Object |
|---|---|---|
| /documents/storage.doc | 53315C6D . . . | 31532 |
| /testing/storage.doc | 7B4B17CF . . . | 31532 |

Thus, the underlying object storage system is leveraged to allow the programmatic creation of multiple file system views for stored objects. In an embodiment involving a fixed-content object store, when the file is modified, a new object will be created, which provides intrinsic Copy on Write (COW) update functionality.

Share Definition

Figure 4:
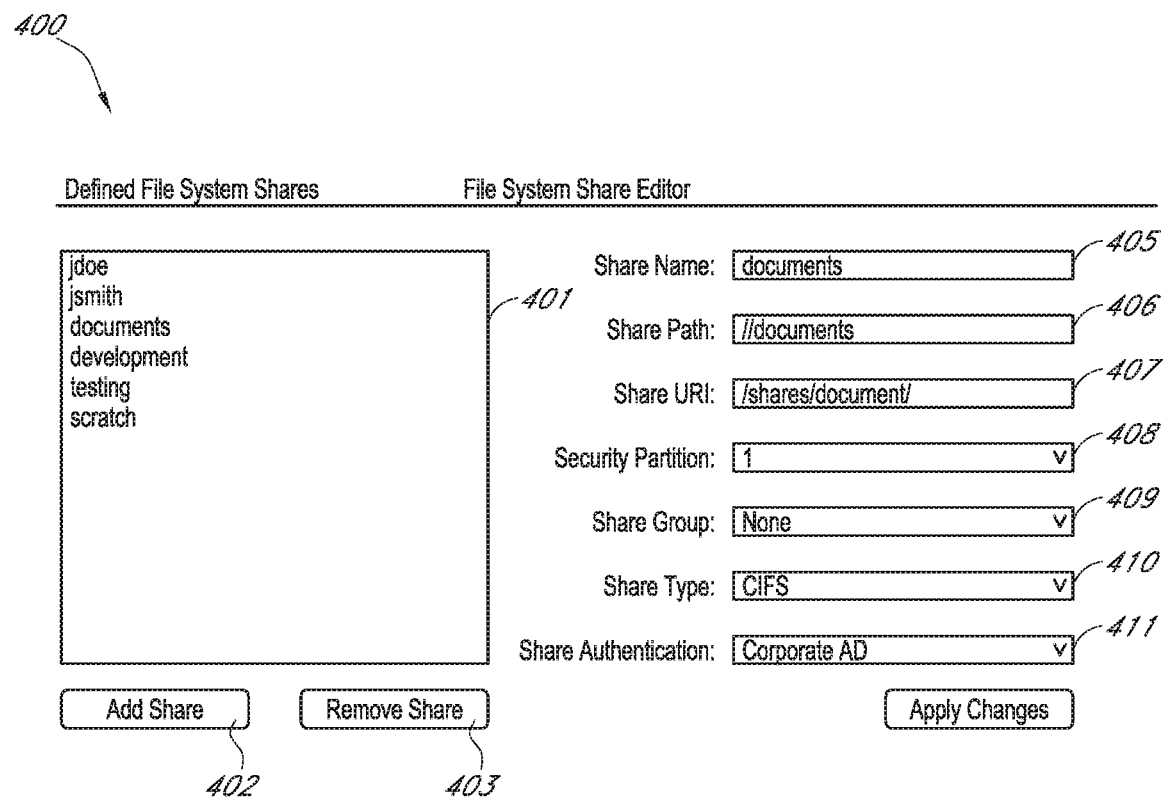
FIG. 4 is a sample graphical user interface for editing file system view shares.

In an embodiment, a user can define a file system view by creating a new "share," where a share is considered to be an addressable namespace that allows access to a given file system view. An example interface for creating a share is depicted in FIG. 4.

In one embodiment, Share Definition is performed at a grid wide level, with the user interface provided to an administrator optionally having the ability to restrict visibility to a security partition by security partition basis or to a given subset of grid administrative domains. In other embodiments, shares may be defined for portions of a grid, such as a single gateway server or a subset of file servers.

Once a share is created, the name, path, URI, security partition, group, type, and authentication details are specified. In an embodiment, a graphical user interface 400 is presented, and the user inputs the information into the interface. Here and elsewhere throughout this specification, wherever a graphical user interface is presented, it is to be understood that information may be alternately input via a text interface, a script, an initialization file, or other means. It is further to be understood that the user interface may be laid out in arrangements different from the arrangements presented in the figures, and that interface elements may be added or removed within the spirit of the invention.

In one embodiment, the user interface 400 includes a list of defined file system shares 401 with control buttons to add a share 402 and remove a share 403. The interface contains further inputs for creating a new share. The share name field 405 is a user-specified arbitrary name that is used to identify the share within the administrative interface. The share path field 406 is used for NFS and CIFS shares, and provides a unique address for mounting them via network-attached storage protocols. The share URI field 407 specifies a prefix for access via HTTP.

The security partition field 408 indicates the security partition to which content placed into the share is stored. An object store may be configured to support one or more security partitions. This drop down menu shows all currently defined security partitions. Security partitions as described here may be implemented as administrative domains or partitions, as described elsewhere in this specification. In other embodiments, the object store may not support security partitions, in which case this input would not be necessary.

The share group field 409 defines an optional higher level grouping that a share can belong to. For example, a series of shares for individual users could all be included in a "User Shares" group. In an embodiment, the user interface to define groups, which is not shown, is similar to the user interface above for adding, removing and defining shares 400. This drop down menu 409 shows all currently defined share groups, and the default option of the share not belonging to a share group. In an embodiment, more than one share group can be designated.

The share type field 410 indicates how the share is made available to clients. In an embodiment, the drop down menu comprises the options "HTTP," "CIFS," "NFS," and combinations of those three. In other embodiments, the menu may include other options and/or combinations, perhaps based on the protocols offered in the system.

The share authentication field 411 indicates the authentication source for client actions performed on the share. The drop down menu shows all currently defined authentication sources, which are defined in another user interface, which in one embodiment is similar to the share definition interface 400. Authentication types can include systems such as Active Directory servers and LDAP servers, and may involve multiple authentication servers, with controls on how each possible authentication source is used.

Share Export

Figure 5:
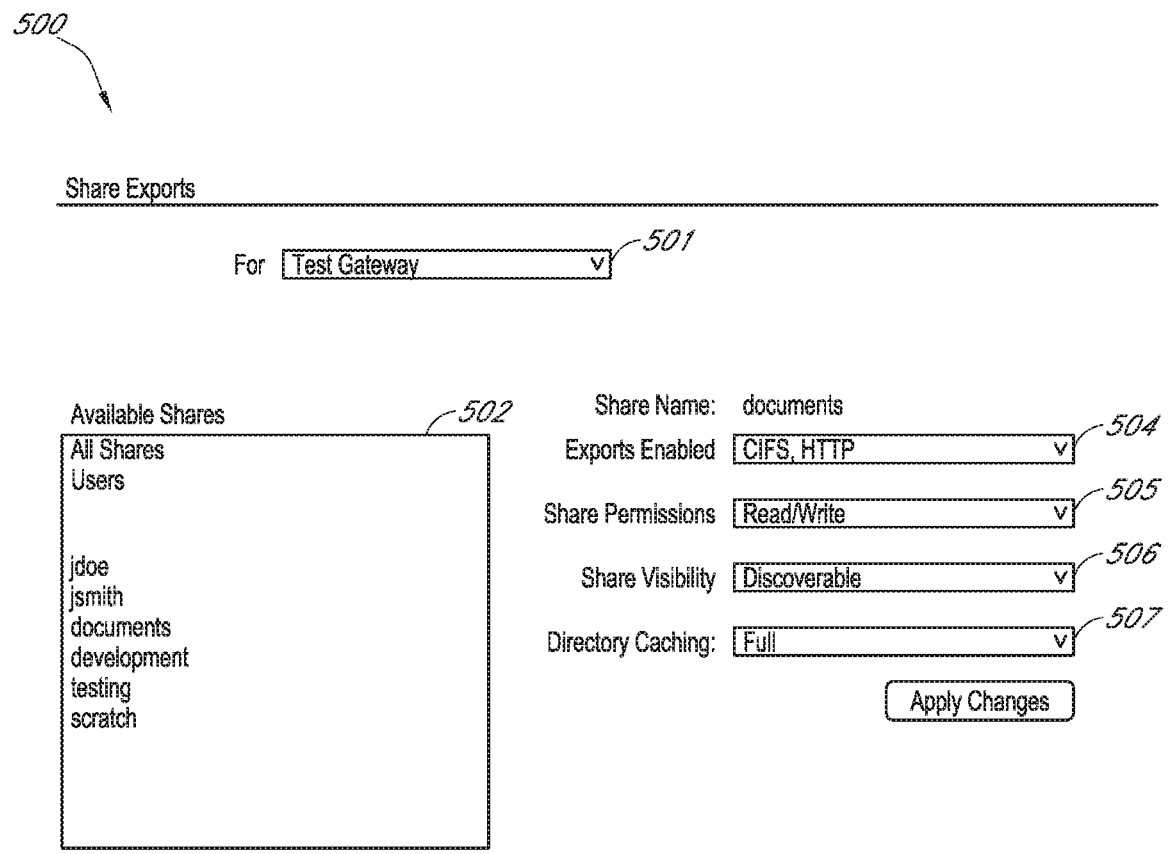
FIG. 5 is a sample graphical user interface for exporting file system view shares.

In some embodiments, shares that are created are not initially "exported" to gateways, so the shares are not accessible on any gateway. Once shares have been defined, they must be exported before they can be accessed by clients. FIG. 5 presents a sample interface 500 for designating the exportation of shares.

In an embodiment, share exporting is performed on a gateway by gateway level, where gateways are topological entities defined in a grid that provide client storage services. The interface for exporting shares may be provided to a system-wide administrator or to particular gateway administrators, and the authorization needed to export shares may differ from the authorization needed to create or modify shares.

In an embodiment, the interface 500 includes a drop-down box 501 to select a gateway, and a list 502 of all defined shares that are available to be exported from that gateway. Shares may not be available for export from a given gateway if the share is in a security partition that the gateway does not have access to, if a share is defined in a different administrative domain than the gateway belongs to, if the gateway is not capable of providing the services required to export the share as configured, or for other reasons.

When a share or share group is selected from list 502, the export options associated with that share or group of shares can be configured. The exports enabled field 504 indicates which export protocols should be available for clients to access the share. This is limited by the share type configured by the share, and the protocols available are the intersection of these two configurations. The share permissions field 505 indicates if full read/write access should be provided, or the share should be limited to read-only access. The share visibility field 506 indicates if the field should be discoverable via CIFS and HTTP protocols. In some embodiments, these fields may or may not be present or utilized, depending on the nature of the particular protocol selected.

The directory caching field 507 indicates how the gateway should maintain the local directory cache. In one embodiment, the field 507 includes three options: no local cache, opportunistic caching, and full directory caching. If no local cache is maintained, every directory operation requires a query to the grid to determine directory contents and file metadata, which consumes the least storage resources, but imposes the highest latency. Opportunistic directory caching will cache the results of directory contents and file metadata, and will subscribe for updates to the share, with updates resulting in cached data being purged. Finally, a full directory cache populates the entire directory structure of the share, and keeps it synchronized by subscribing to updates. When a share is exported through a gateway, at that point it becomes available for client access.

Share Access

Once exported, shares may be accessed through industry standard network file system protocols such as NFS and CIFS, and through HTTP object access, that provides a hierarchical view of the files and directories. This can be extended to other file sharing protocols, such as FTP and WebDAV, as explained at various points throughout this specification.

Based on the settings from the user interfaces described above, users with appropriate permissions and credentials are able to view, create, modify and delete files and directories on the shares. The gateways communicate with users via the designated file protocols, and further communicate with the object store and object manager to perform synchronization operations as described below.

File System View Consistency

In an embodiment, multiple clients are able to write to a share at any time; that is, shares do not need to be "locked" prior to writing. In such an embodiment, the presence of multiple writers can result in an inconsistent file system state. Furthermore, state changes that are occur close enough in time can be proven to be equivalent to state changes that occur during disconnected operation, as the latency associated with eventual consistency is equivalent to a short disconnection. That is, if a client places a file on a share at a gateway and that gateway is disconnected from other parts of the file storage grid, then an inconsistent file system state can arise. To illustrate how this can occur, consider the sequence of events in Table 4.

TABLE 4

|  | Time 0 | Time 1 (Islanded) | Time 2 (Islanded) | Time 3 |
|---|---|---|---|---|
| Gateway A | /foo/ (ID 1) /foo/bar (ID 2) | /foo/ (ID 1) /foo/bar (ID 3) | /foo/ (ID 1) /foo/bar (ID 3) | /foo/ (ID 1) /foo/bar (ID 4) |
| Gateway B | /foo/ (ID 1) /foo/bar (ID 2) | /foo/ (ID 1) /foo/bar (ID 2) | /foo/ (ID 1) /foo/bar (ID 4) | /foo/ (ID 1) /foo/bar (ID 4) |

In this example, two files are updated with different values when the two gateways are connected to subsets of the grid that are disconnected from each other (islanded). A user connected to Gateway A creates the file "Moo/bar" at time 1, and a user connected to Gateway B creates a different file "Moo/bar" at time 2. When the two gateways reconnect to the system, they must resolve the conflict, namely that they have two different files both named "Moo/bar" on their respective shares.

In this case, if the latest update wins (shown), any changes made on Gateway A will be lost. This may or may not be acceptable, depending on the application, and versioning may be enabled to preserve these updates.

Another example of these classes of conflicts is illustrated by Table 5:

TABLE 5

|  | Time 0 | Time 1 (Islanded) | Time 2 (Islanded) | Time 3 |
|---|---|---|---|---|
| Gateway A | /foo/ (ID 1) /foo/bar (ID 2) | /foo/ (ID 1) /foo/baz (ID 2) | /foo/ (ID 1) /foo/baz (ID 2) | /foo/ (ID 1) /foo/baz (ID 3) |
| Gateway B | /foo/ (ID 1) /foo/bar (ID 2) | /foo/ (ID 1) /foo/bar (ID 2) | /foo/ (ID 1) /foo/bar (ID 2) /foo/baz (ID 3) | /foo/ (ID 1) /foo/baz (ID 3) |

In Table 5, a user at Gateway A renames file "/foo/bar" to "/foo/baz" at Time 1. At time 2, a user creates a new file "/foo/baz" at Gateway B. When the gateways reconnect, the two gateways have inconsistent file system views, which, if resolved by the latest-update-wins rule, results in the renamed file being lost. If the order was reversed, the newly created file would have been replaced by the renamed file.

As long as directories are manipulated by gateways by Object ID instead of path, directory rename operations are safe. Even if a directory is renamed on one gateway, while new files are being stored in the old directory on a second gateway, these files will end up in the renamed directory after the grid has resynchronized. However, if two identically named directories are created independently, and then populated with files, upon resynchronization, these directories would need to be merged.

To address these synchronization conflicts, embodiments of the invention include configurable conflict resolution mechanisms, to allow for user-defined methods of resolving conflicts. Embodiments including such mechanisms are described in detail throughout this specification.

File Placement Rules

In an embodiment, synchronization of file system views among gateways is governed by file placement rules. These rules allow an administrator to specify how files should be placed across shares. Rules may be installed and/or stored at various components of a storage grid or other system. In an embodiment, rules are stored on one or more object managers 104 as shown in FIG. 1.

Figure 6:
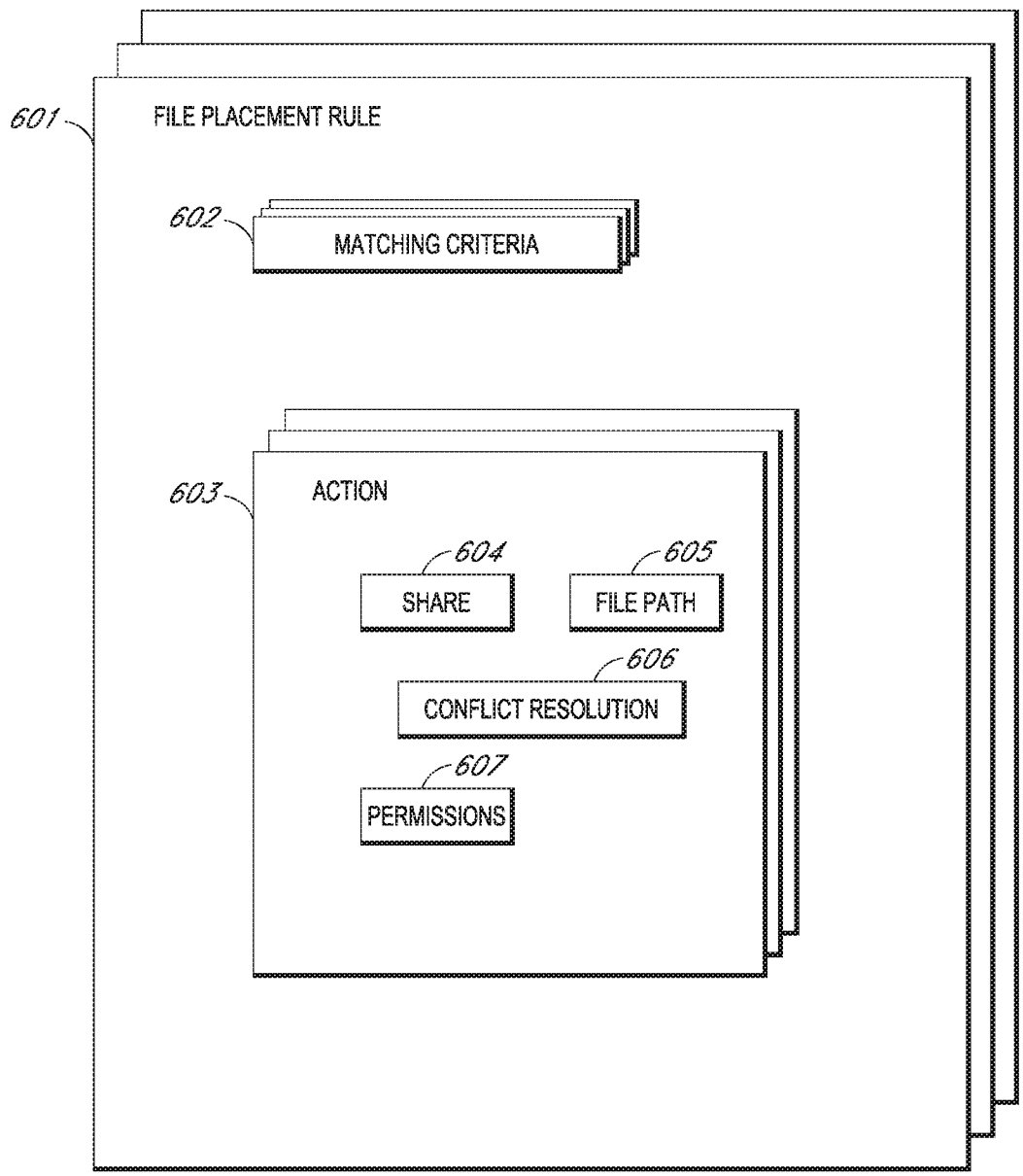
FIG. 6 is a representation of a file placement rule.

FIG. 6 illustrates the contents of file placement rules 601 in some embodiments of the invention. The file placement rules are defined through the grid administrative user interface. Each rule has two parts, matching criteria 602 and actions 603. One of skill in the art will recognize that file placement rules may be implemented by other means, such as by software program code or scripts.

These rules may be defined after the shares have been defined, but before they have been exported or used. Once the rules are in place, an administrator may test the system to ensure that they are operating as expected before putting them into production.

File Placement Rule Matching Criteria

In an embodiment, file placement rules are triggered by the creation and destruction of objects in the underlying storage system. Each time an object is created or destroyed (or updated, in a non-fixed content system), the matching criteria are evaluated against that object. In another embodiment, file placement rules may be evaluated for objects on a periodic basis, or upon the occurrence of various events.

In an embodiment, an object being evaluated against a file placement rule 601 is first compared to the matching criteria 602 associated with the rule. If the metadata associated with the object matches the matching criteria for a given rule, then the rule is considered to have matched, and the actions corresponding with the rule are then applied. If multiple rules match against a given object, then in one embodiment the actions of all of the matching rules are applied. Alternately, the rules may be ordered, and only the first matching rule is applied, or the rule may specify whether to continue processing other rules or to halt the processing of further rules.

In one embodiment, the matching criteria for a rule comprises at least one filter. Each filter comprises a set of conditions. If all conditions in any filter are true, the object is considered to have satisfied the matching criteria. This provides ability to create any arbitrary set of AND and OR relationships when defining the matching criteria. In other embodiments, matching criteria may be implemented as a decision tree, flowchart, FORTH stack, program listing, or similar means.

In one embodiment, each condition comprises a metadata field for the object being evaluated, a comparison operator, and a value. Values can be static, or can be dynamic, such as "#{system.isodate}," which evaluates to the current date in an ISO-8601 string format. In one embodiment, dynamic values are surrounded by curly braces with the opening brace preceded by a number sign; other identifiers may be used in the alternative. In one embodiment, each time an object is created or destroyed, the conditions are evaluated by taking the specified metadata field of the object and checking if it satisfies the comparison operator with respect to the value. For example, if a rule had "source gateway" as its metadata field, "equals" as its operator, and "Gateway 7" as its value, then an object would match if its metadata field named "source gateway" had a value equal to "Gateway 7." As any metadata item can be compared, the set of objects that match a given rule can be narrowed arbitrarily, as allowed by the metadata present.

FIG. 7 illustrates a possible graphical user interface 700 for setting configuration parameters associated the matching criteria of a file placement rule. Filters may be named using a name input 701, and may be added or removed by selecting an appropriate button 702. The inputs for conditions for each filter include a metadata field selection 703, an operator selection 704, and a value input 705. For some operators, no value input or multiple inputs may be presented. Conditions for a filter may be added or removed by selecting an appropriate button 706.

In one embodiment, the file placement rules that match for a given object are cached with that object, along with a rules revision identifier. This caching may be performed in an object manager, object store, or elsewhere. The rules revision identifier is changed when the rule changes. When an object is deleted or for other reasons compared against a rule, if the rules revision identifier has not changed, then actions associated with the cached list of matching rules can be performed without having to re-evaluate the matching criteria.

File Placement Rule Actions

Returning to FIG. 6, in one embodiment, each rule 601 comprises one or more actions 603 which are performed when an object matches against a rule. Each action 603 comprises a reference to a destination share 604, and configuration items that determine what happens in this destination when an object is created, modified, or deleted. In one embodiment, these configuration items include at least a file path 605, a conflict resolution mechanism 606, and a permissions designation 607.

When a matching object is created, a file (and directory, if needed) can be created in the destination share. The behavior of this creation, including the path for the file to be created, how to handle conflicts (already existing files), and the permissions in the destination can be specified by the rule actions 603. The rule action can be easily expanded to allow additional aspects of the configurable file placement to be controlled.

The rule actions 603 may also contain information for object updates and deletion, which may be analogous to the information used for object creation.

Figure 8:
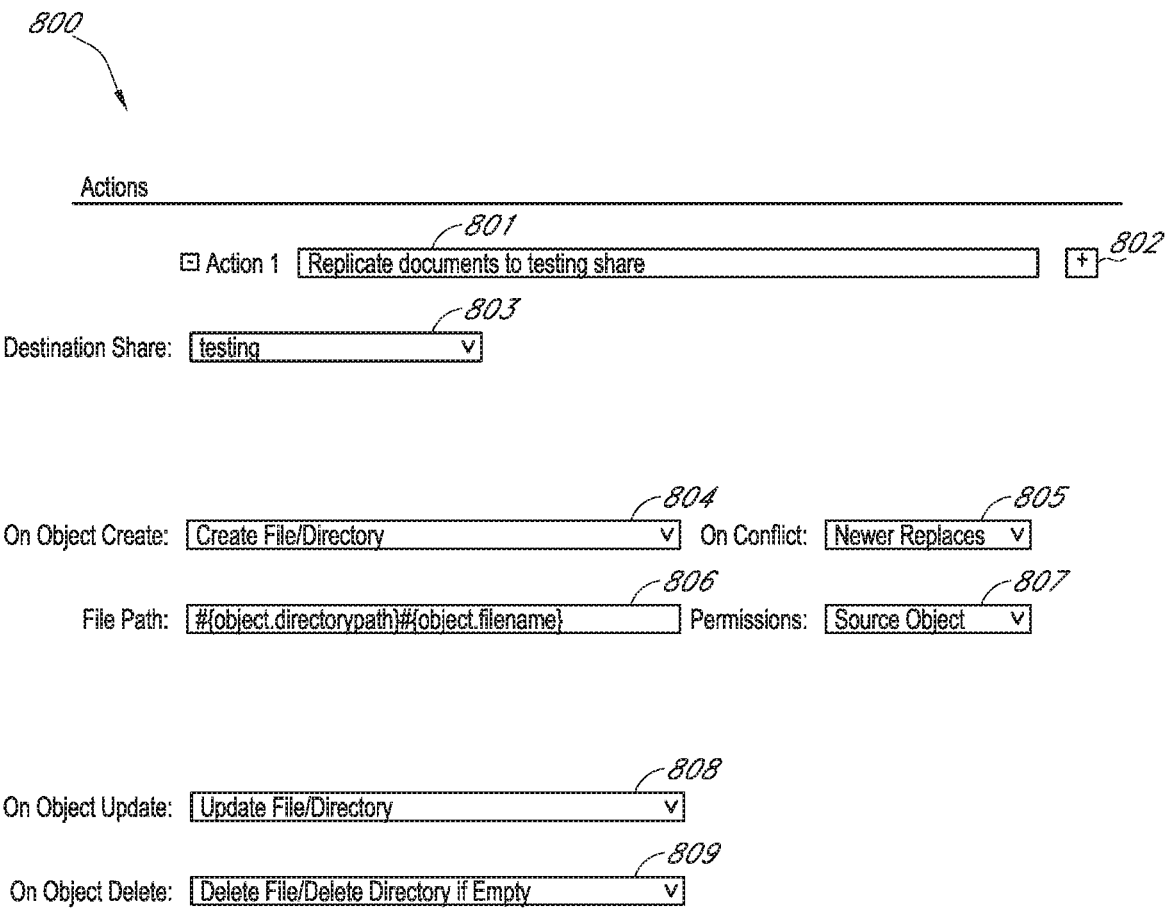
FIG. 8 is a sample graphical user interface for specifying file placement actions.

FIG. 8 depicts a sample user interface 800 for specifying an action for a file placement rule in one embodiment of the invention. The user interface 800 allows for multiple actions to be created with button 802. For each action, a name 801 may be provided. A destination share 803 is associated with each action. The interface also contains inputs for the action to be taken upon object creation 804, the conflict resolution mechanism 805, the file path 806, and the permissions 807. The inputs may include dynamic values, as seen in the file path 806. The action specification interface also includes inputs for actions to be taken upon update 808 and deletion 809 of objects.

In an embodiment, before a rule is applied, it can be evaluated to see what files will be affected, and what the final placement of the files will be. This report can allow administrators to see what the results of a new rule, or a change to a rule will be.

Rule Changes

In an embodiment, the system updates shares upon creation of rules. If there are already objects in the system that should be included in the file system representation, the system translates the matching criteria of the rule into a query that identifies all of the objects that would have matched against the rule. The actions of the rule can be applied to the matching objects.

This approach is also used when rules are changed, as the file system representation can be rebuilt (retroactive evaluation).

Changing the rules for a share already containing files requires performing several actions. Shares may contain files placed by rules that once changed, should no longer be placed there. Likewise, there may be files that should be placed on a share according to the rules, but as the rule has been changed, the file was not placed there. Thus, rules must be evaluated both going forward and retroactively. In an embodiment, adding, changing, or removing a rule may trigger retroactive evaluation of rules to determine what changes need to be made to a share. The retroactive evaluation may be limited to the changed rules, or it may be performed for all rules.

In an embodiment, the interface for creating or changing a rule includes an "apply retroactively" option. When the "apply retroactively" option is selected, this query is run, the local directory cache is flushed, and all matching objects are placed in the destination gateway processing queues in timestamp order. This ensures that clients will always have a consistent representation, even during a rebuild or rules re-evaluation.

Addition of or changes to rules may be handled according to a method performed in one embodiment. The method may be performed on the gateway, object manager, and/or object store devices. First, it is determined which destination file system representations, such as shares, are affected by the added or changed rule. Then, cached elements on the destination file system representation that were a result of the rule are invalidated. Caches may be present on any number of devices in the system, and they may be entirely or partially invalidated. Next, a query is performed to determine what objects match the new or updated rule. Finally, the caches may be repopulated using the results of the query, thus reconstructing the destination file system representation.

File Placement Flows

Figure 9:
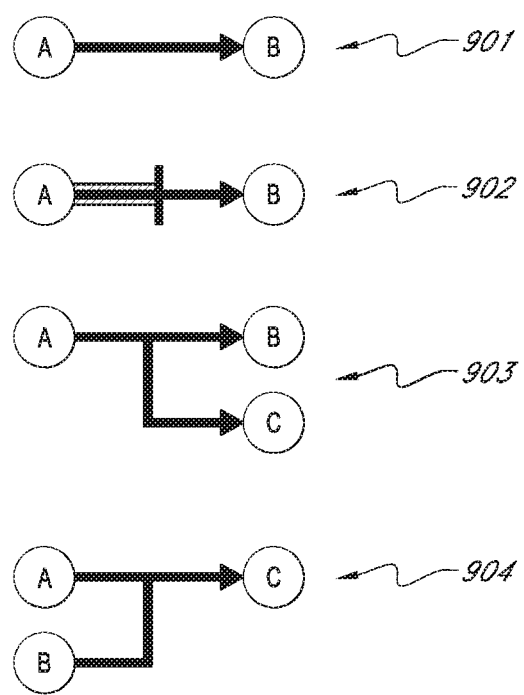
FIG. 9 is a set of possible file placement workflows.

The configuration of file actions thus allows the creation of high-level file workflows. FIG. 9 depicts several sample file workflows. These workflows may be defined by the file placement rules described above.

In 901, all file system objects from source A are also placed to destination B. Destination B may be at a different level within a file system, such as the path "/users/jdoe/" being the source, and the destination being "/teams/project7/leader/".

In 902, all file system objects from source A that match a filter criteria are placed in destination B.

In 903, all file system objects from source A are placed in destination B and a destination C. Destination B and C may be at different levels within a file system. This can be considered a result of two identically configured unidirectional one-to-one placement flows, each with different destinations.

In 904, all file system objects from source A and from source B are placed in destination C. File system objects are merged together at the destination.

When file system objects from two or more sources are merged, a conflict resolution mechanism 606 associated with a file placement rule is invoked to determine how the merged file system representation appears. When a conflict occurs, options include only showing the newer, only showing an object from a primary source, always replacing the object, showing the object based on the permissions of the creating user, creating a merged object based on the contents of the two objects, versioning the object, or renaming objects from secondary sources. Note that because files are tracked by Object ID, deleting a file from source A, where the rules had an identically named object from source B visible at destination C, would not result in the object from source B being removed from C.

Because different shares can have different rules applied, it may be possible for conflicts to be resolved in different ways at different shares. This can be useful, for example, for document collaboration, as the share used by the document editors may be set up to resolve conflicts by only retaining the newest version of the document, while an auditor share may include all versions of the document.

Application of Rules and Share Synchronization

In an embodiment, each gateway subscribes to receive notifications about any changes to the objects within its share. This may be used to keep directories and file metadata cached at edge gateways consistent and up to date. Each time a directory or file within the share is changed, a notification is enqueued to each gateway providing access through that share that has subscribed to receive notifications. As notifications are received, the cache can be updated or invalidated, depending on the gateway configuration. This provides basic synchronization between gateways, and guaranteed consistency in appropriate situations, such as in the absence of disconnected operation and when there is only one writer at any given time.

Figure 10:
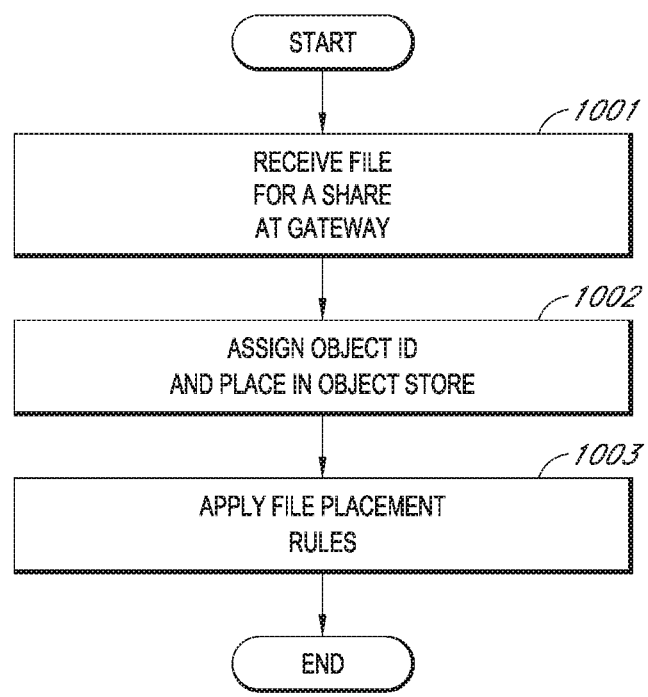
FIG. 10 is a flowchart of a process for managing files in a data object storage system.

FIG. 10 depicts a possible method of synchronizing shares on gateways utilized in an embodiment. The method may be performed on an object manager connected to one or more gateways, but other computing devices may perform this method, such as the gateways themselves. Also in some embodiments, different steps of the method are performed on different devices in the system. In step 1001, a gateway receives a file from a client. The file is associated with a share on the gateway and, within that share, a position in the hierarchical file system view of the share. In an embodiment, objects that are created, updated, or deleted are placed in a queue, and processing of objects occurs by removing objects from the queue and processing them in turn. This may be done by transferring the objects from the first queue to an evaluation queue, where they are held while being processed.

In step 1002, the file is stored as an object in the object store. The object may be assigned an object ID, such as a UUID, as described elsewhere in this specification.

Next, in step 1003, file placement rules are applied to the newly stored object. In an embodiment, the rules are executed on the object manager. Based on the application of these rules in accordance with methods described throughout this specification, the object manager may transmit one or more notifications to gateways, The notifications may contain different amounts of information in various embodiments, ranging from full information about placement of the object on one or more shares to a mere notification to invalidate a cache. Notifications that contain information about the file, such as the object ID, file placement, and/or file metadata, may allow the gateways to update their file system views without further network traffic. On the other hand, notifications with less information may be faster to transmit and process and thus preferable in some situations.

In an embodiment, if the object manager is unable to communicate with a gateway, then the object manager places the notification in a queue, and when the object manager becomes able to communicate with the gateway, it transmits all the notifications in the queue to the reconnected gateway. The object manager may also resend notifications on a periodic basis.

In an embodiment, an additional step may be included, of automatically notifying gateways of a file received at one gateway, regardless of whether any file placement rule is executed. This would provide basic share synchronization even in the absence of file placement rules. This additional step can be also implemented using the file placement rules. For example, a file placement rule might have a matching criteria that matches all files placed in a share, and an action that directs the file to be placed in the same location on the same share in every gateway.

In an embodiment, the information and calculations associated with an object are cached and the cached information is reused if the inputs to the calculations have not changed. The information and calculations may include, for example, the results of evaluating matching criteria of rules, expansions of dynamic file placement locations, calculations of conflict resolution results, and the like.

Methods analogous to that of FIG. 10 may be employed for updates or deletions of files in shares.

Figure 11:
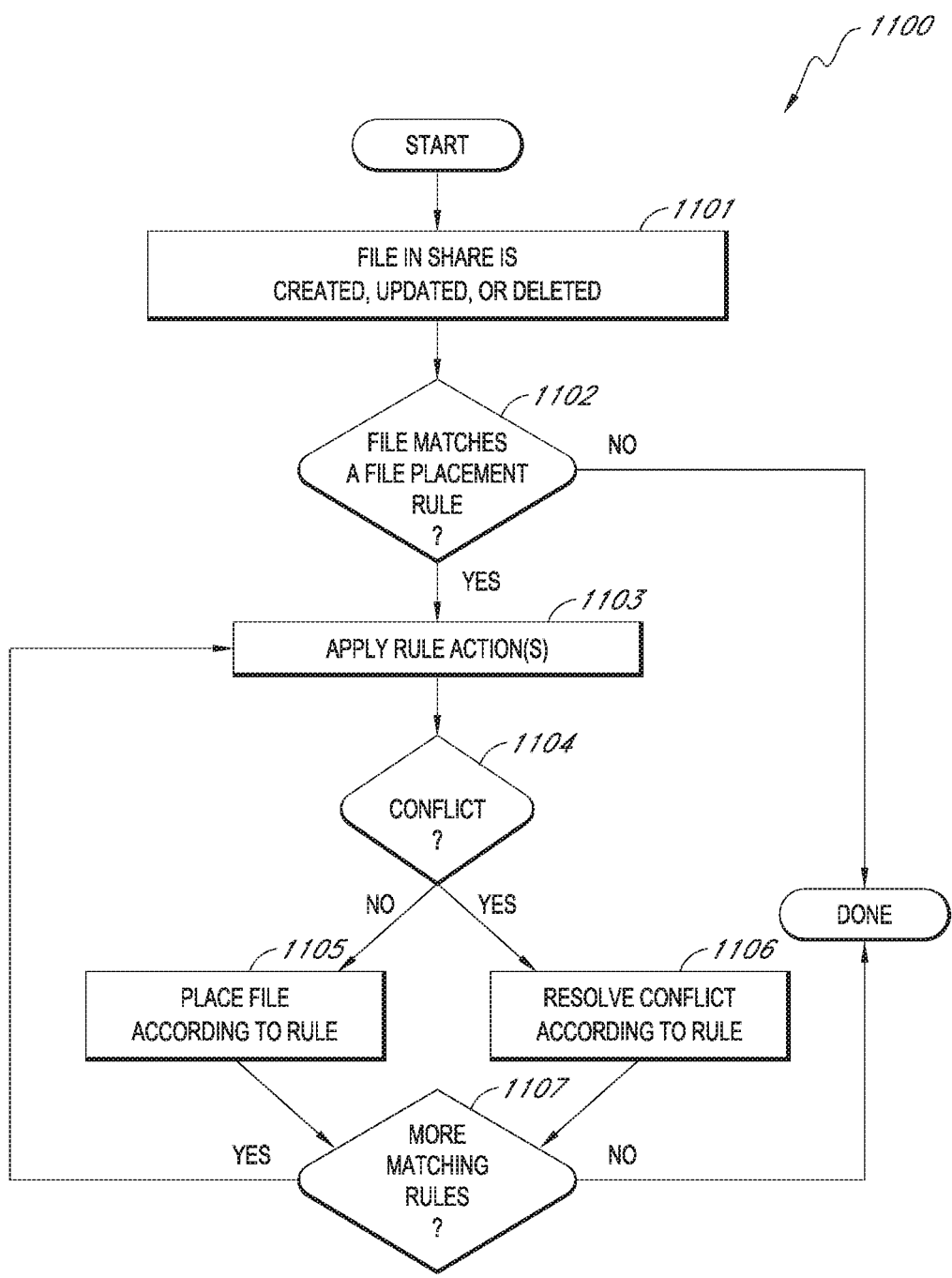
FIG. 11 is a flowchart of a process for applying file placement rules.

FIG. 11 illustrates an embodiment of a method of applying file placement rules 1100, which may be used in step 1003 described above. The method may be executed at the object manager, or it may be executed on gateways or other devices. At step 1101, a file is created, updated, or deleted in a share. This event triggers the performance of the remainder of the method. In another embodiment, the method may be performed on a scheduled basis, or based on some other triggering event.

At step 1102, it is determined whether the file matches a file placement rule. In one embodiment, this is done by iterating through the available placement rules and applying the matching criteria of each rule against the file identified in step 1101, until a rule matching the file is found. If no file placement rule matches, then the method terminates. In other embodiments, the applicable rule may be identified by an index or table lookup. Additionally, as described elsewhere in this specification, references to matching rules may be cached with the file or object.

If a file placement rule is found to match, then the action or actions associated with the rule are applied to the file at step 1103. As this may involve placing the file in shares at different gateways, this step may include queuing or transmitting notifications or updates to gateways.

Upon placing the file in accordance with the rule at step 1103, it is necessary to determine, at step 1104, if that placement creates a conflict. If there is no conflict, then the file is placed in the appropriate location in the share at step 1105. If a conflict does arise, then at step 1106 the conflict resolution mechanism associated with the file placement rule action being executed is used to resolve the conflict.

Once step 1105 or 1106 is performed, it is determined whether there are additional file placement rules to be performed. If so, the procedure is repeated until no more rules match.

Share to Share Placement Example

Figure 12:
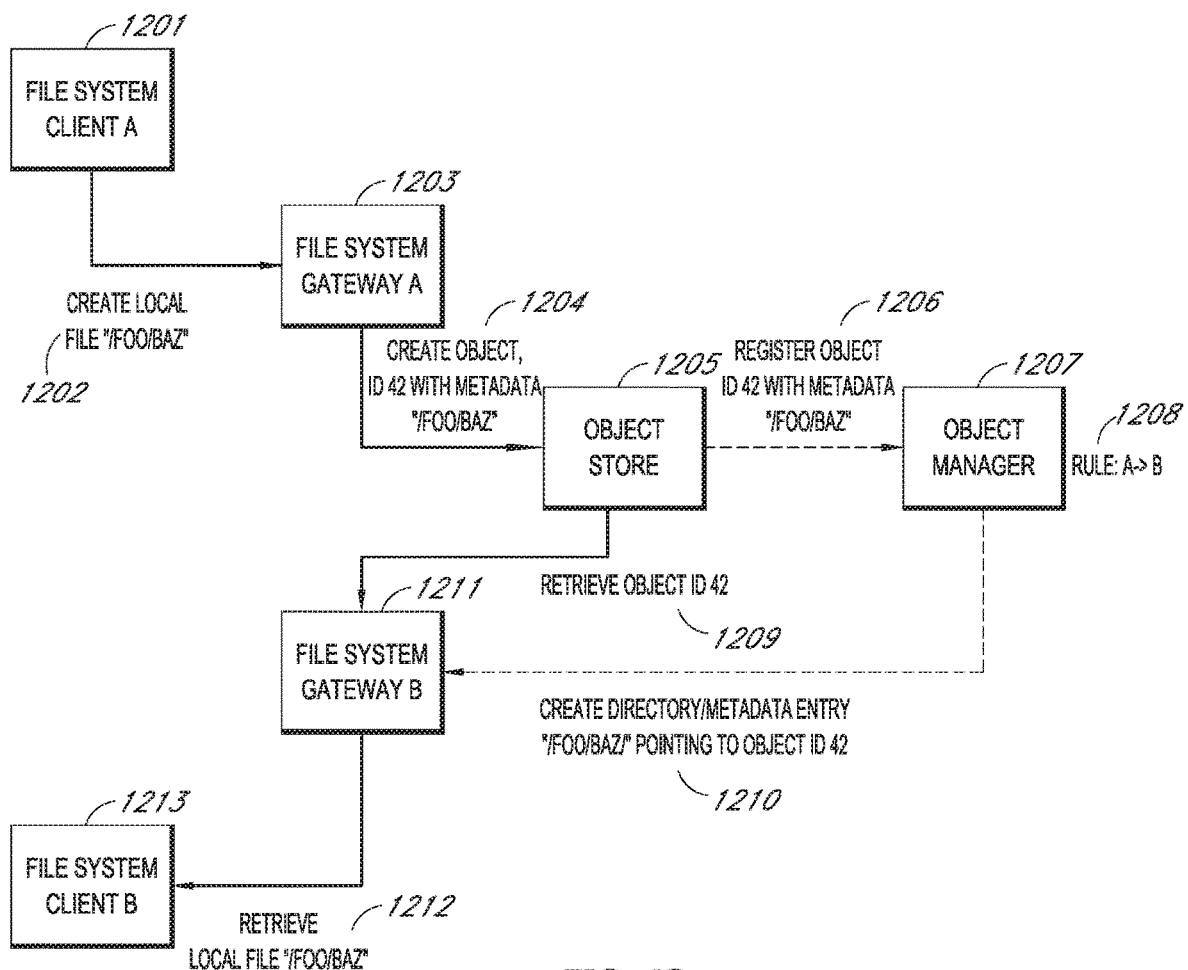
FIG. 12 is a representation of a workflow of rule-based file placement.

FIG. 12 illustrates one example of execution of a rule 1208 according to one embodiment. In the example, the applicable rule is a one-way synchronization rule for all files and directories from a share on Gateway A to a second share on Gateway B.

File system client A 1201 creates a file "/foo/baz" on a source share of a file system gateway A 1203, at step 1202. Changes made to the file system representation on the source share on gateway A result in the storage of new objects (or the updates to existing objects) in the object store. Thus, at step 1204, gateway A 1203 creates an object in object store 1205. In this case, the new object has ID 42 and metadata "/foo/baz" corresponding to the original file name. The object manager 1207 is notified of these changes by the object store 1205 in step 1206, and invokes the rule 1208 for each matching object update. The object manager 1207, in accordance with the rule 1208, then transmits updates to gateway B 1211 (which exports the destination share) at step 1210, which creates new references to the objects in the directory cache of the destination share. Gateway B 1211 is able to retrieve the object by its object ID from the object store 1205, which is shown at step 1209. Now when file system client B 1213 attempts to retrieve the file "/foo/baz" from gateway B 1211 at step 1212, the gateway is able to identify the object associated with the name "/foo/baz" as a result of the update transmitted in step 1210, and it can provide client B 1213 with the file by retrieving it from the object store 1205 as shown in step 1209.

The net result of this application of the rule 1208 is that all changes made to the source share through gateway A are synchronized to the destination share on gateway B, which would be used, for example, in a scenario where one or more read-only views are to be kept in sync.

This can be extended to situations where multiple destinations are required by adding additional actions to the rule to specify additional destinations. Bi-directional placement can be accomplished with two rules, one that places files from the source share to the destination share, and a second rule that places files from the destination share of the first rule to the source share of the first rule. In one embodiment, the rules chain, so each change to the destination share would trigger the second rule if a change was made, but the second rule triggered would perform no actions, as the destination share was already consistent.

Object to File System Rules

In one embodiment, the same capabilities that are available for replicating file system representations between gateways is also available for objects that are directly ingested via an object API. This can be done by object-to-file-system rules, which take advantage of the fact that the source file system gateway can be treated as a generic source of objects.

Figure 13:
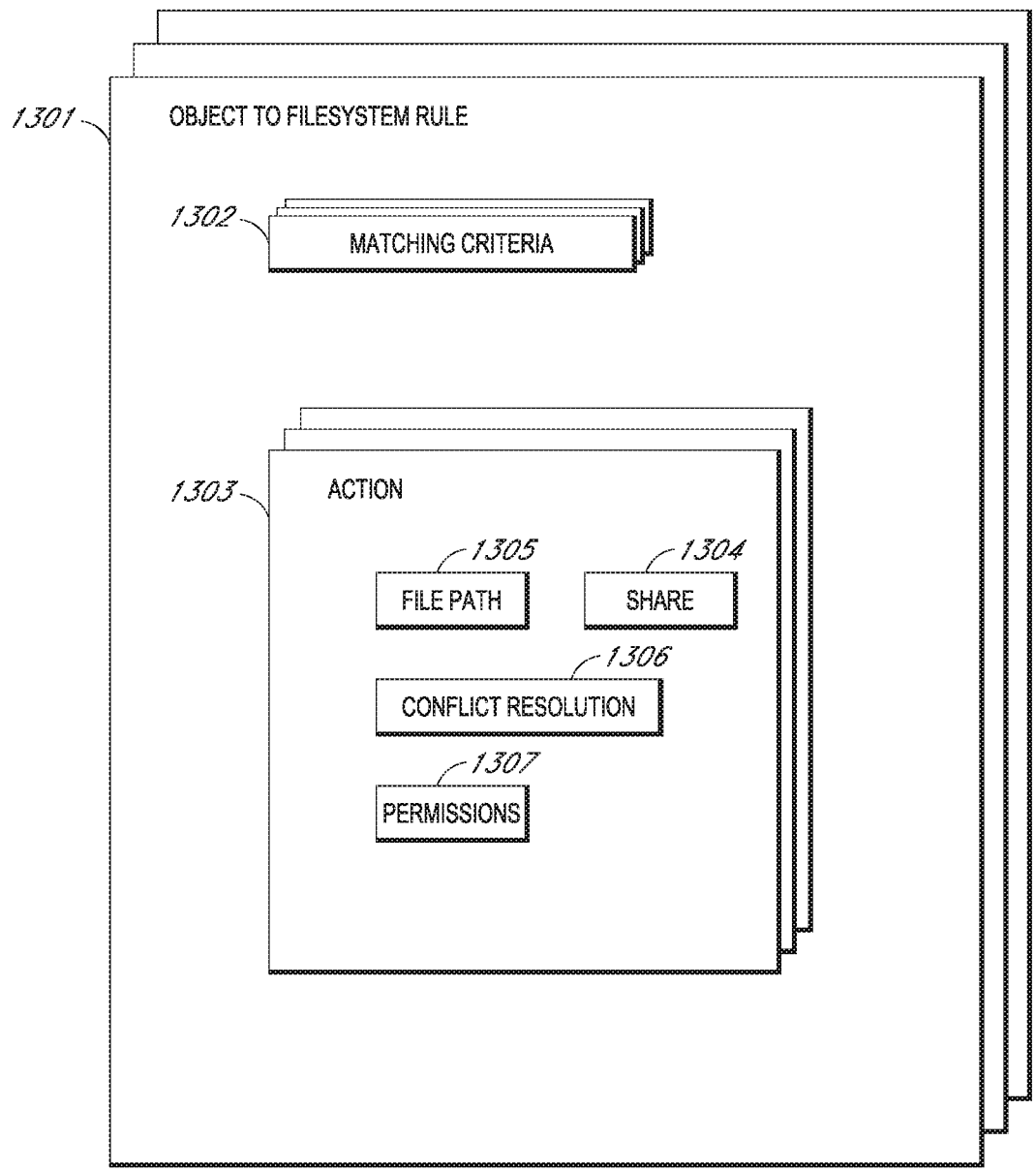
FIG. 13 is a representation of an object-to-file-system rule.

The structure of an object-to-file-system rule in an embodiment is shown in FIG. 13. A rule 1301 includes matching criteria 1302 and one or more actions 1303 which comprise a reference to a share 1304, a possibly dynamic file path 1305, a conflict resolution mechanism 1306, and a permissions designation 1307. The structures of the matching criteria and actions are much like the structures of the matching criteria and actions of file placement rules described with respect to FIG. 6 and elsewhere, although the two types of rules may have different structures, and various embodiments of the invention include only file placement rules, only object-to-file-system rules, both, and/or alternatives to both.

FIG. 14 shows a possible graphical user interface 1400 for specifying object-to-file-system rules in an embodiment of the invention. Matching criteria may be specified as one or more filters, which can be given names with input 1401 and added or removed with buttons such as 1402. Conditions for filters may be given a metadata field with input 1403, a comparison operator with input 1404, and a value, possibly dynamic, with input 1405. Conditions may be added or removed with buttons 1406. In the example shown, the matching criteria restrict the rule to only objects with an "Application Identifier" metadata field equal to the value "Omnyx," and only to objects with an "Object Type" metadata field equal to "Image." This illustrates how the rules can be restricted to a specific object type originating from a specific vendor's system. Of course, as the rules can be arbitrary based on available metadata, there are much more complex relationships that can be specified. The final restriction is that the object must have an image identifier. This ensures that the required metadata is present, and is useful when dealing with objects that have mixed metadata.

In the actions section, several actions can be created, with names provided by input 1407, and actions created or removed with buttons such as 1408. Each action may have a destination share specified with input 1409. The action to be taken upon creation, update, or deletion of files can be specified with inputs 1410, 1414, and 1415. Actions can also have a file path specified with input 1412, and a conflict resolution mechanism and permissions designation specified with inputs 1411 and 1413. In the example shown, files are created on the share labeled "Omnyx Images," with files and directories being created when an object is created. The file path is constructed using a combination of fixed constant values and object metadata values. If conflicts are encountered, the newer object replaces the older object for the given file path, and permissions are inherited from the parent directory at the destination location.

Additional Aspects and Embodiments

As described, an embodiment of the system can be constructed around an existing data storage system. In one embodiment, file system changes, such as creating, modifying and deleting files, result in the creation, modification and deletion of objects within the storage system. File system changes generate a notification that is sent to all gateways that export the share that was changed. In one embodiment, granularity would be on the share level, instead of on the gateway level. Secondary gateways apply changes described in the notification to the share. When objects are created, modified and deleted, the content management systems that own the objects evaluate the file placement rules, possibly in parallel or batched together to be performed as a single operation, and for each action, the systems generate notifications to the active primary gateway for the corresponding share. This notification may include a newly assigned UUID that refers to the original object. The active primary gateway applies the file system changes described in the notification to the share. This can be based on the notifications described previously. In addition to these core processing steps, an embodiment includes a new user interface for the addition, modification and deletion of file placement rules. New infrastructure components can be added to provide persistent and reliable queuing services. The object store of an embodiment includes mutable metadata, in which changes to the mutable metadata associated with a UUID may be maintained on a UUID by UUID basis. In one embodiment, the approach for specifying rules for content placement is applied to content notification to external systems. In the same way that gateways subscribe to notifications, and receive updates as changes occur to objects represented by a file view, external applications can create notification queues and define matching criteria to indicate what notifications they are interested in.

In one embodiment, the system is expanded to include inter-grid notifications. File system representations external to the grid could be attached through these notifications and kept synchronized. Thus, the system may be configured to allow communication among multiple object stores, object managers, and/or gateways.

In one embodiment, the data storage grid is broken into several "Administrative Domains," and at least some objects are assigned to an administrative domain, or in other embodiments more than one administrative domain. The administrative domains provide a level of security, and the various permissions fields described elsewhere in this specification can utilize the administrative domains for placement of objects and providing read or write access to them. In an embodiment, the file placement rules and/or object-to-file-system rules are specified to apply to content from only one of the administrative domains or only a selection of administrative domains. The shares, or file system representations, also may be associated with administrative domains, and the rules may be thus limited to placing files into shares in the same administrative domains.

Additionally, administrative domains can limit the ability of users to create, modify, and/or view rules, as only users with sufficient permissions with respect to a particular administrative domain will be able to affect rules associated with the domain.

In an embodiment, administrative domains are further divided into partitions. Rules and/or shares can be associated with particular partitions, and rules can be specified to only apply to content in a particular partition or in several partitions. Permissions for users can be limited with respect to partitions as they can be limited with respect to administrative domains.

Administrative domains and/or partitions can be used to limit the number of objects that need to be considered when applying rules. In one embodiment, only those objects that are in the same administrative domain or partition as a rule are considered for matching against the matching criteria of the rule.

Aspects of approaches to remote file storage may be integrated with various embodiments of the invention to provide greater flexibility and functionality. Four of such approaches are the independent namespace, the clustered local file namespace, the loosely coupled regional repository, and the synthetic file namespace.

In an independent namespace, file system clients are able to see a consistent file system views through a single gateway.

In this mode of operation, a file system client stores files onto a standard filesystem view provided by a file system gateway. Such a view may be provided by standard network file system protocols, such as NFS or CIFS. As files and directories are created, retrieved, updated and deleted, file system gateway A uses the object store as a storage destination.

Metadata included with the objects stored to the object store are passed on to the object manager, which stores this metadata locally, and is able to do additional processing based on the metadata, as needed.

In a cloud-based system, local file system views of cloud stored data are based around gateways that provide consistent views by storing the directory (metadata) locally on the gateway.

In a clustered file system, multiple separate tightly coupled systems are kept synchronized, such that any access to any cluster member will return a consistent view of the file system.

If a file system gateway consists of multiple clustered computing systems, all file operations performed by the file system client can be spread across the cluster members. Directory updates are kept synchronized across these cluster members, and like the independent namespace case, as files and directories are created, retrieved, updated and deleted, the file system gateway uses the object store as a storage destination.

Clustered file system views of cloud stored data provide consistent views by storing the directory (metadata) locally as part of the clustered file system.

Tightly coupled local cluster file systems are often found in systems within a building, or in special configurations, within a city. File operations may include locking, which ensures that the cluster is logically consistent and may only allow one entity to make changes to any given file or directory at a given time.

Loosely coupled regional repositories provide geographically dispersed access into a location-independent file repository, but do not enforce locking and are frequently used in situations with low transaction rates. Such systems include the revision control and document repository systems. These systems, using the "checkout-checkin" model, allow user-driven creation of local file system views that can be altered, then merged back into the global repository. Any conflicts result in the merge operation failing, and must be manually fixed.

A synthetic file namespace involves creating file system views into an object store by translating file system operations into cloud metadata query operations, then translating the results of these queries back into file system responses.

In this model, file operations performed by a file system client are translated by a file system gateway into object queries. The results of these object queries are then translated back into file system results, and returned to the file system client.

This architecture may involve maintaining a local directory and associated metadata on the gateway.

With this architectural model, the gateway can be made stateless, and thus, clustered access can be achieved without having to implement direct synchronization between file system gateways. As the file system view always reflects the state of the metadata in the object store, multiple gateways can provide common file system access to the object store. This is well suited for geographic dispersion.

Many instances of each of these scenarios may be concurrently used within a single file storage system, and each instance may have specific requirements.

In one embodiment, the system described herein runs on several computing devices. Moreover, in some embodiments, the features of the system are available via a fully-hosted application service provider that manages and provides access to the system, for example, via a web interface or other interface. In other embodiments, the system may be available via partially hosted ASPs or other providers. In additional embodiments, the system may be accessed through a broad assortment of interface channels, including XML, fixed format data inquiry, batch or a comprehensive and easy-to-use web browser user interface. In yet further embodiments, the system may be a customer-side installed solution and may be included and/or in direct communication with one or more third party systems.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the computing devices include and/or communicate with a database module or data source. The database module or data source may be implemented using one or more databases, such as a relational database, such as Sybase, Oracle, CodeBase and Microsoft® SQL Server as well as other types of databases, such as, for example, a flat file database, an entity-relationship database, and object-oriented database, and/or a record-based database.

In one embodiment, each of the computing devices is IBM, Macintosh, or Linux/Unix compatible. In another embodiment, the computing devices comprise a server, a laptop computer, a cell phone, a personal digital assistant, a kiosk, an interactive voice response device, a voice response unit, or an audio player, for example. In one embodiment, the computing devices include one or more CPUs, which may each include microprocessors. The computing devices may further include one or more memory devices, such as random access memory (RAM) for temporary storage of information and read only memory (ROM) for permanent storage of information, and one or more mass storage devices, such as hard drives, diskettes, or optical media storage devices. In one embodiment, the modules of the computing are in communication via a standards based bus system, such as bus systems using Peripheral Component Interconnect (PCI), Microchannel, SCSI, Industrial Standard Architecture (ISA) and Extended ISA (EISA) architectures, for example. In some embodiments, components of the computing devices communicate via a network, such as a local area network that may be secured.

The computing devices are generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing devices may be controlled by a proprietary operating system. Conventional operating systems control and schedule computer processes for execution, perform memory management, provide file system, networking, and I/O services, and provide a user interface, such as a graphical user interface ("GUI"), among other things.

The computing devices may include one or more commonly available input/output (I/O) devices and interfaces, such as a keyboard, mouse, touchpad, microphone, and printer. Thus, in one embodiment the computing devices may be controlled using the keyboard and mouse input devices, while in another embodiment the user may provide voice commands to the computing devices via a microphone. In one embodiment, the I/O devices and interfaces include one or more display device, such as a monitor, that allows the visual presentation of data to a user. More particularly, a display device provides for the presentation of GUIs, application software data, and multimedia presentations, for example. The computing devices may also include one or more multimedia devices, such as speakers, video cards, graphics accelerators, and microphones, for example.

In one embodiment, the I/O devices and interfaces provide a communication interface to various external devices and the communications medium via wired or wireless communication links. For example, the computing devices may be configured to communicate with the communications medium using any combination of one or more networks, LANs, WANs, or the Internet, for example, via a wired, wireless, or combination of wired and wireless communication links.

All references cited herein are intended to be incorporated by reference. Although the present invention has been described in terms of specific embodiments, it is anticipated that modifications and alterations to the invention will be apparent to those of ordinary skill in the art. It is thus intended that the above disclosure be construed as illustrative of embodiments of the invention and not restrictive of the invention, and that the scope of the invention be determined by the claims.

Further Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The modules, algorithm, techniques, processes, or methods described in connection with embodiments disclosed herein may be embodied directly in computer hardware configured to perform the embodiments disclosed herein, in software executed by a processor, or in a combination of the two. In some embodiments, any software application, program, tool, module, or layer described herein may comprise an engine comprising hardware, software, or a combination of the two configured to perform embodiments described herein. In general, functions of a software application, program, tool, module, or layer described herein may be embodied directly in hardware, or embodied as software executed by a processor, or embodied as a combination of the two.

A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

The invention claimed is:

1. A method, comprising:
  receiving, by a distributed object storage system, a storage manipulation operation for a file in response to a command from a client system;
  updating, by the distributed object storage system, an object in an object store, the object associated with the file and the updating the object being based on the storage manipulation operation for the file;
  identifying, by the distributed object storage system, a file placement rule as corresponding to the file, the file placement rule specifying how to place the file across one or more addressable namespaces corresponding to one or more file system views;
  generating, by the distributed object storage system, a notification comprising information about the object corresponding to the file, the information including an object identifier and file metadata to allow one or more gateways to update a file system view of the one or more file system views at the one or more gateways; and
  transmitting, by the distributed object storage system based on the file placement rule, the notification to the one or more gateways associated with the distributed object storage system to keep the one or more file system views at the corresponding one or more gateways up to date.

2. The method of claim 1, further comprising:
  instructing, by the distributed object storage system, the one or more gateways with information about the object to invalidate a cache at the one or more gateways.

3. The method of claim 1, further comprising:
  queuing, by the distributed object storage system, the notification for transmission in response to the one or more gateways becoming unavailable until the one or more gateways is available again.

4. The method of claim 1, wherein the file placement rule comprises a first file placement rule, the method further comprising:
  identifying, by the distributed object storage system, a second file placement rule as corresponding to the file.

5. The method of claim 1, further comprising:
  resending, by the distributed object storage system, the notification to the one or more gateways on a periodic basis.

6. The method of claim 1, wherein the distributed object storage system comprises an object manager which performs the receiving, updating, identifying, generating, and transmitting.

7. A non-transitory machine readable medium having stored thereon instructions for performing a method comprising machine executable code which when executed by at least one machine, causes the machine to:
receive a storage manipulation operation from a client system for a file in an addressable namespace;
update an object in an object store based on the storage manipulation operation, the object associated with the file;
identify a file placement rule from among a plurality of file placement rules as corresponding to the file based on a criterion of the file placement rule matching the file, the file placement rule specifying how to place the file across one or more addressable namespaces corresponding to one or more file system views;
generate a notification comprising an object identifier and file metadata as information about the object to allow the one or more gateways to update a file system view of the one or more file system views at the one or more gateways; and
transmit, based on the file placement rule, the notification to the one or more gateways associated with the at least one machine within a distributed object storage system to keep the one or more file system views at the corresponding one or more gateways up to date.

8. The non-transitory machine readable medium of claim 7, further comprising machine executable code which when executed by the at least one machine, causes the machine to:
instruct the one or more gateways with information about the object to invalidate a cache at the one or more gateways.

9. The non-transitory machine readable medium of claim 7, further comprising machine executable code which when executed by the at least one machine, causes the machine to:
queue the notification for transmission in response to the one or more gateways becoming unavailable until the one or more gateways is available again.

10. The non-transitory machine readable medium of claim 7, further comprising machine executable code which when executed by the at least one machine, causes the machine to:
resend the notification to the one or more gateways on a periodic basis.

11. The non-transitory machine readable medium of claim 7, wherein the machine comprises an object manager.

12. A computing device, comprising:
a network interface;
a memory containing machine readable medium comprising machine executable code having stored thereon instructions for performing a method of synchronization across one or more gateways associated with a distributed object storage system; and
a processor coupled to the memory and the network interface, the processor configured to execute the machine executable code to cause the processor to:
receive a storage manipulation operation for a file in response to a command from a client system;
update an object in an object store based on the storage manipulation operation for the file, and the object associated with the file;
identify a file placement rule as corresponding to the file, the file placement rule specifying how to place the file across one or more addressable namespaces corresponding to one or more file system views;
generate a notification comprising information about the object corresponding to the file, the information including an object identifier and file metadata to allow one or more gateways to update a file system view of the one or more file system views at the one or more gateways; and
transmit, based on the file placement rule, the notification to the one or more gateways associated with the distributed object storage system to keep the one or more file system views at the corresponding one or more gateways up to date.

13. The computing device of claim 12, wherein execution of the machine executable code further causes the processor to:
instruct the one or more gateways with information about the object to invalidate a cache at the one or more gateways.

14. The computing device of claim 12, wherein execution of the machine executable code further causes the processor to:
queue the notification for transmission in response to the one or more gateways becoming unavailable until the one or more gateways is available again.

15. The computing device of claim 12, wherein:
the file placement rule comprises a first file placement rule, and
execution of the machine executable code further causes the processor to identify a second file placement rule as corresponding to the file.

16. The computing device of claim 12, wherein execution of the machine executable code further causes the processor to:
resend the notification to the one or more gateways on a periodic basis.

17. The computing device of claim 12, wherein the computing device comprises an object manager.

* * * * *